United States Patent [19]

Caveney

[11] 4,001,898

[45] Jan. 11, 1977

[54] FIXED DOG LADDER STRAP

[75] Inventor: Jack E. Caveney, Hinsdale, Ill.

[73] Assignee: Panduit Corporation, Tinley Park, Ill.

[22] Filed: Oct. 6, 1975

[21] Appl. No.: 619,884

[52] U.S. Cl. .............................................. 24/16 PB
[51] Int. Cl.$^2$ ......................................... B65D 63/00
[58] Field of Search ......... 24/16 PB, 206 A, 206 B, 24/16 BB; 248/74 PB

[56] References Cited

UNITED STATES PATENTS

| 2,888,729 | 6/1959 | Lethern | 24/206 B |
| 3,102,311 | 9/1963 | Martin | 24/16 PB |
| 3,149,808 | 9/1964 | Weckesser | 24/16 PB |
| 3,186,047 | 6/1965 | Schwester | 24/16 PB |
| 3,463,427 | 8/1969 | Fisher | 24/16 PB |
| 3,654,669 | 4/1972 | Fulton | 24/16 PB |
| 3,872,547 | 3/1975 | Caveney | 24/16 PB |

FOREIGN PATENTS OR APPLICATIONS

| 497,468 | 11/1953 | Canada | 248/74 PB |

Primary Examiner—Bernard A. Gelak
Attorney, Agent, or Firm—Charles R. Wentzel; Richard B. Wakely

[57] ABSTRACT

A self-locking cable tie for forming a plurality of elongate objects such as wires into a bundle. The cable tie comprises an elongate flexible strap positionable about the objects and including a plurality of spaced transversely extending abutments; and a head extending from adjacent one end of the strap having a strap entrance face, a strap exit face, and a transverse aperture extending between the faces for receiving the distal end of the strap. The cable tie further comprises non-pivotal locking means carried by the head and extending into the aperture for securely engaging a preselected one of the abutments and pusher means carried by the head and extending into the aperture. The pusher means is responsive to retrograde movement of the strap to push the abutment to be held into engagement with the locking means and the pusher means has a position wherein its spacing from the locking means is sufficient to permit strap passage therebetween whereby the strap can be threaded with relatively low force as the pusher means is not required to resist strap withdrawal forces.

14 Claims, 13 Drawing Figures

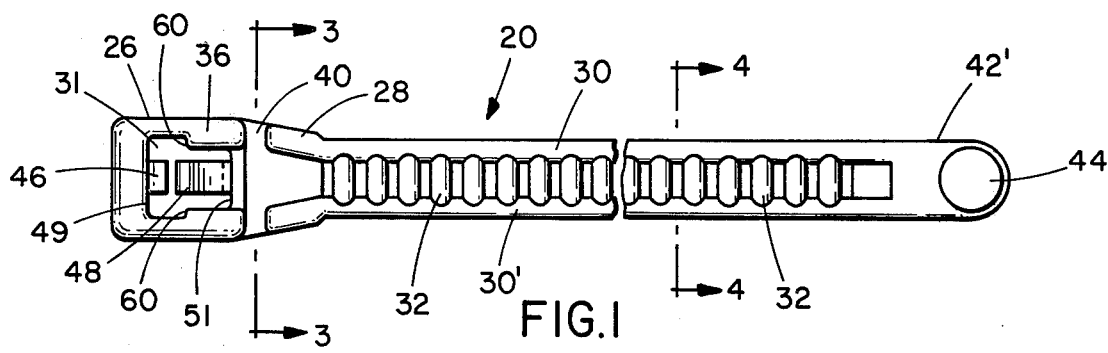
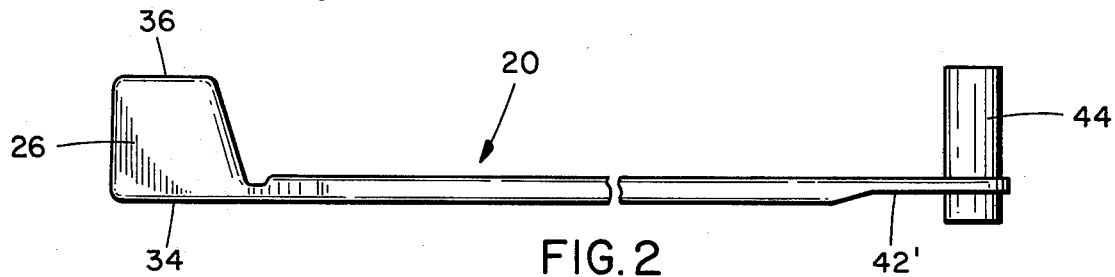
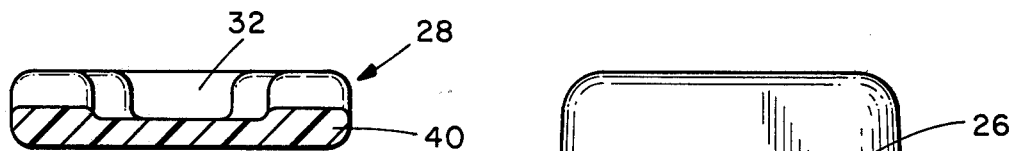
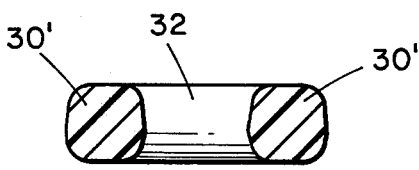
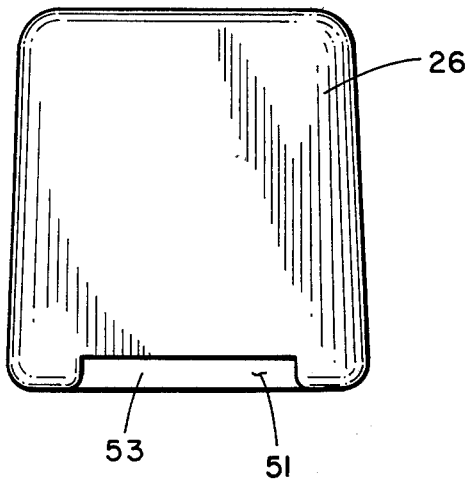
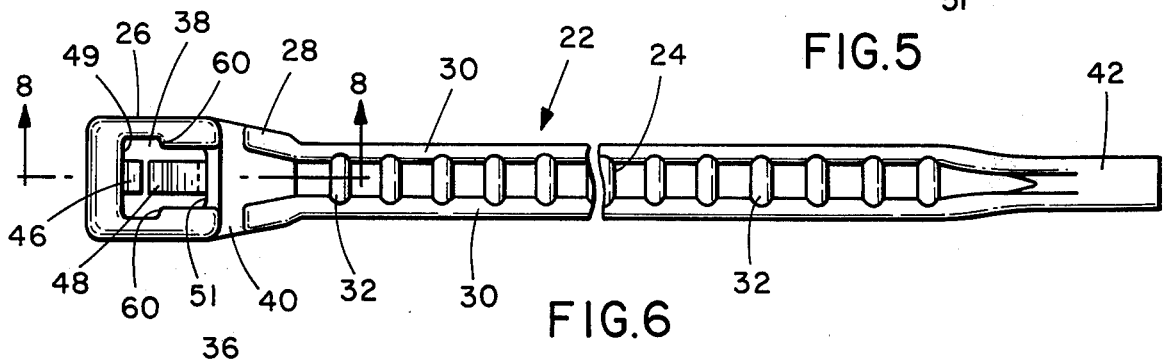
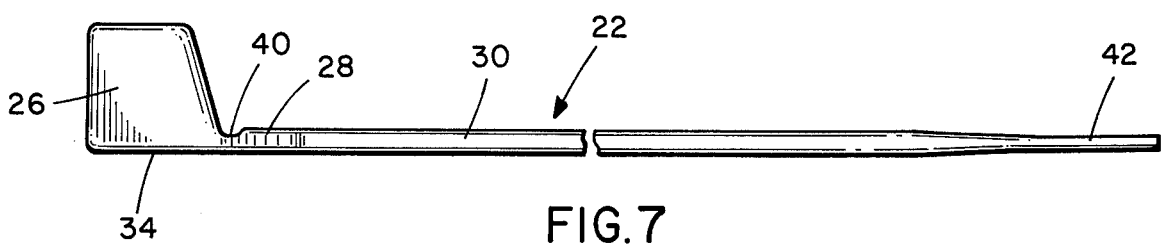

FIXED DOG LADDER STRAP

BACKGROUND OF THE INVENTION

This invention relates to self-locking cable ties and more particularly to such a cable tie having a ladder strap and non-pivotal locking means for securely holding the strap.

Cable ties of molded thermoplastic material for conveniently forming elongate objects such as wires into a bundle have come into common use in the last twenty years. More recently, cable ties having stretched straps of reduced cross-sectional area have appeared. Since longitudinal stretching of the plastic strap to orient the molecules in the direction of the stretch causes a dramatic increase in tensile strength, such stretched straps are at least as strong as non-stretched straps which have a significantly greater cross-sectional area. It is also desirable to use a stretched strap in applications where a relatively long strap is needed because of the difficulties encountered in molding a long strap to its final dimensions. More particularly, increased heat and pressure are required to completely fill a long mold cavity and the increased heat may tend to cause degradation of the thermoplastic material while the increased pressure could cause the mold to pump open or flash. Examples of prior art molded ties are shown in U.S. Pat. Nos. 3,186,047 and 3,660,869.

Prior art self-locking cable ties typically include locking means pivotally carried by the head of the cable tie. Such locking means could either be integral with the head, such as a toothed-plastic pawl for engaging teeth on the strap, or non-integral with the head, for example, a metallic barb for biting into the strap. The integral locking means has an advantage in that it can be provided at the time of the molding and, accordingly, the number of operations required to manufacture the cable tie is reduced. Stretching the strap not only causes it to increase in tensile strength per unit cross-sectional area and also causes the thermoplastic material to significantly harden. As teeth formed on the strap at the time of molding tend to become distorted or "smear" during stretching, it is difficult for a prior art integral locking means to effectively engage such a stretched strap.

To overcome this disadvantage, a stretched strap of the ladder type has been proposed having longitudinally extending side rails joined by spaced transverse rungs. As opposed to the class of cable ties having non-integral metallic barbs which pierce or bite into the strap, the locking means used with a ladder strap extends between adjacent rungs. The locking means used with one prior art ladder strap is a long pivotal plastic finger pivotally joined to the head by a neck and engagable with a ledge upon attempted strap withdrawal. The neck must be sufficiently flexible to permit convenient threading of the strap into the head. Of course, the neck limits the strength of the finger and of the entire cable tie. An example of such a cable tie is shown in U.S. Pat. No. 3,766,608.

Straps of stretched thermoplastic material which are not self-locking have been proposed for bundling packages or a plurality of objects and for attaching tags and buttons to clothing. They typically require separate crimp connectors for application to an overlapping portion of the strap. Reference may be made to U.S. Pat. Nos. 3,444,597 and 3,447,207.

SUMMARY OF THE INVENTION

Among the several objects of the present invention may be noted the provision of an improved self-locking cable tie; the provision of such a cable tie which has high tensile strength with reduced cross-sectional area and which, accordingly, reduces material used in fabrication; the provision of such a cable tie which avoids the strength limitations attendant to the use of a pivotal locking means; the provision of such a cable tie which is convenient in use and which provides relatively low threading force of the strap through the head; and the provision of such a cable tie which is reliable in use, has long service life, and is simple and economical to manufacture. Other objects and advantageous features of the present invention will be in part pointed out hereinafter in the specification and in the claims, and in part will be apparent.

Briefly, the cable tie of the present invention includes an elongate flexible strap, a head extending from adjacent one end of the strap, non-pivotal locking means carried by the head, and pusher means carried by the head. The strap includes a plurality of spaced transversely extending abutments. The head has a strap entrance face, a strap exit face and a transverse aperture extending between the faces for receiving the free end of the strap. The locking means extends into the aperture for securely engaging a preselected one of the abutments. The pusher means also extends into the aperture and is responsive to retrograde movement of the strap to push the abutment to be held into engagement with the locking means. The pusher means has a position wherein its spacing from the locking means is sufficient to permit strap passage therebetween whereby the strap can be threaded into the head with relatively low force as the pusher means is not required to resist strap withdrawal forces.

BRIEF DESCRIPTION OF THE DRAWINGS

FIG. 1 is a plan of a molded part before stretching and cutting to form a cable tie of the present invention having a ladder type strap;

FIG. 2 is a front elevational view of the part of FIG. 1;

FIG. 3 is an enlarged sectional view taken generally on line 3—3 of FIG. 1;

FIG. 4 is an enlarged sectional view taken generally on line 4—4 of FIG. 1;

FIG. 5 is an enlarged side elevational view of a head of the part of FIG. 1;

FIG. 6 is a plan of the cable tie formed from the part of FIG. 1 after stretching and cutting to form the strap;

FIG. 7 is a front elevational view of the cable tie of FIG. 6;

Corresponding reference characters indicate corresponding parts throughout the several view of the drawings.

DESCRIPTION OF THE PREFERRED EMBODIMENT

Figure 12:
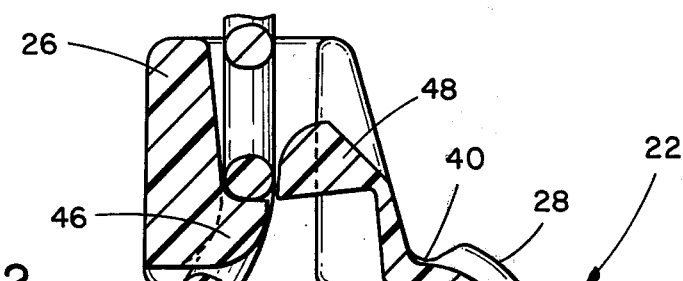
FIG. 12 is an enlarged sectional view of the cable tie of the present invention positioned around a plurality of wires.

Referring to FIGS. 1 and 2, an as-molded part is generally indicated at reference numeral 20. As will appear hereinafter, part 20 is stretched and cut to form a self-locking high strength cable tie 22, shown in FIGS. 6, 7, 12 and 13, of the present invention for forming a plurality of objects such as wires 23 or 23A, see FIGS. 12 and 13, into a bundle which usually is of a generally circular cross-section. Components of part 20 corresponding to components of cable tie 22 except for substantial stretching and/or cutting are designated by a prime (').

Figure 13:
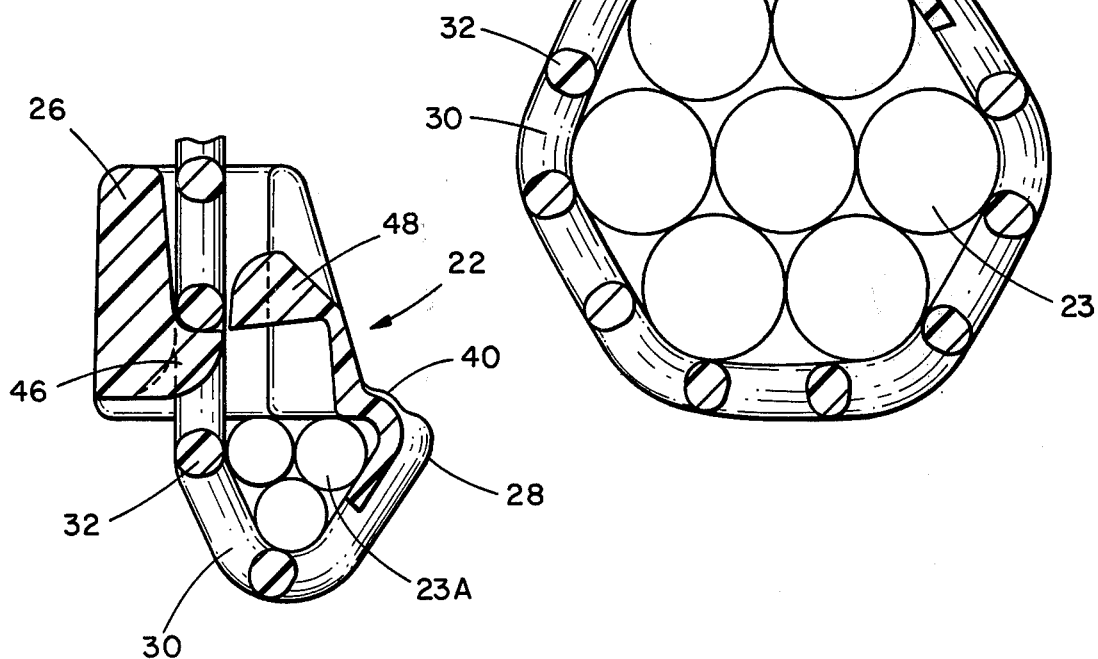
FIG. 13, similar to FIG. 12, shows the cable tie disposed about a small bundle of wires.

Cable tie 22 is integral and comprises an elongate flexible strap 24 made of a thermoplastic material, such as nylon, comprising stretch-oriented molecules; a head 26 extending from adjacent one end of the strap; and a transitional portion 28 joining the head and the strap. Strap 24 is positionable about the objects to be bundled and includes a plurality of spaced, transversely extending abutments. More particularly, strap 24 is of the ladder type and has a pair of spaced, generally longitudinally extending side rails 30 with the abutments constituting rungs 32 joining the rails. Head 26 includes a strap entrance face 34, a strap exit face 36, and a transverse aperture 38 joining the faces. Aperture 38 can be considered to have an axis generally parallel to the strap segment extending through the head shown in FIG. 9. The transitional portion 28 includes a joint 40 of reduced cross-sectional area (see FIG. 3) but which preferably has a slightly greater cross section than the combined cross section of pre-stretched side rails 30' as shown in FIG. 4. As will appear hereinafter, joint 40 functions as a pivot or neck to permit transitional portion 28 to fold back on itself when cable tie 22 is positioned around a small bundle as shown in FIG. 13.

Part 20 includes an elongate tail 42' extending from strap 24 with a pulling lug 44 extending in opposite directions from the tail. Tail 42 is preferably tapered to facilitate insertion of the strap into aperture 38.

Although as-molded nylon parts have relatively unoriented molecules, stretching of the part causes orientation of the molecules in the direction of the stretch with the result that after stretching, although reduced in cross-sectional area, the part has higher tensile strength and breaking strength per unit cross-sectional area than the unstretched part. Stretching also causes hardening of the material.

Part 20 is stretched between lug 44 and head 26 until the material in side rails 30 has its molecular structure oriented. Since those components of strap 24 having small cross sections will stretch before components having greater cross sections, the stretching can be controlled and substantially limited to side rails 30. In this manner, transitional portion 28 and rungs 32 are left substantially unstretched. By way of example, part 20 can be stretched at a temperature of 200° F and at a rate of 50 inches per minute for an overall strap elongation of 75%. As set forth above, the stretching is controlled so that the rungs are not significantly stretched. Side rails 30 between the rungs may be elongated approximately 250%.

Figure 8:
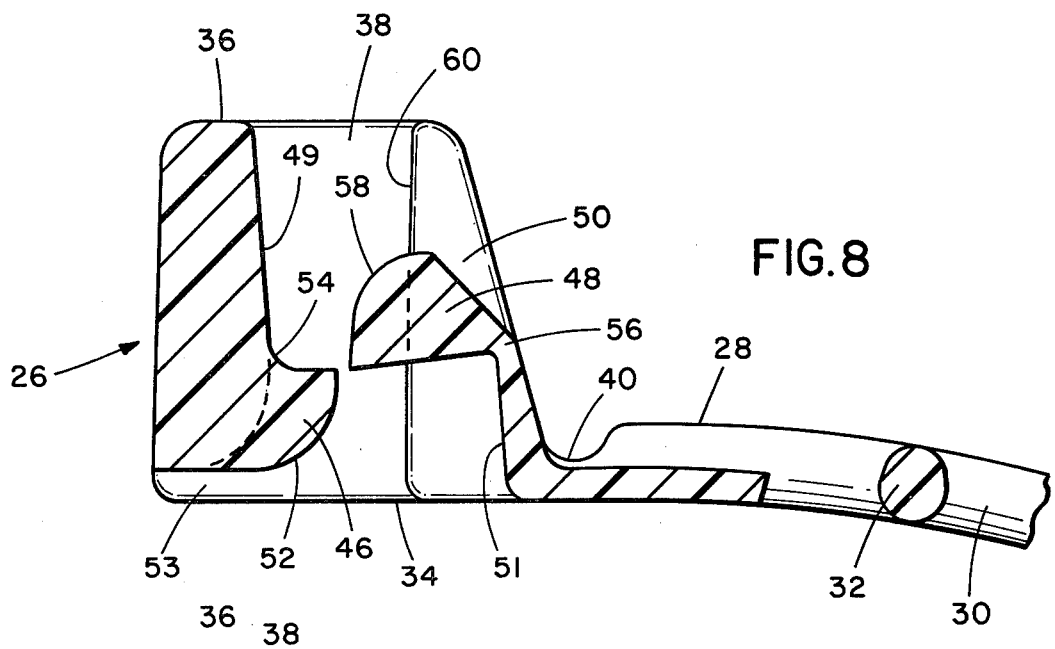
FIG. 8 is an enlarged sectional view taken generally along line 8—8 of FIG. 6.
Figure 9:
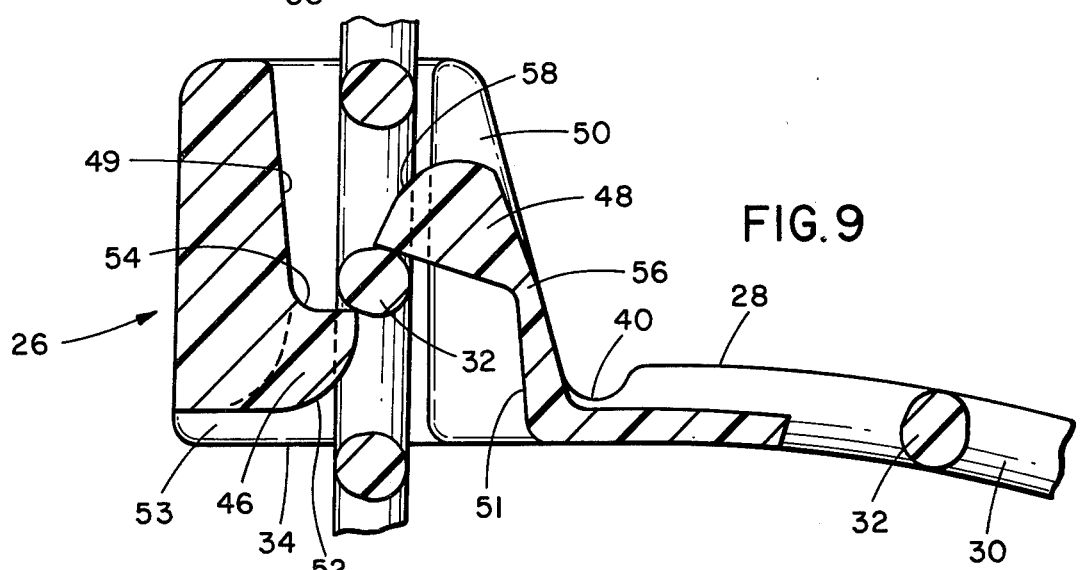
FIG. 9 is similar to FIG. 8 and shows a pusher means of the cable tie being deflected upon insertion of the strap into the head.

Head 26 carries non-pivotal locking means in the form of a fixed dog 46 which extends into aperture 38 and which is shaped to extend between adjacent rungs 32. The head 26 also carries pusher means in the form of a finger 48 pivotally connected to the head which functions, as will appear hereinafter, to move the rungs 32 to be held toward dog 46 upon retrograde movement of the strap. Of course, the term "pivot" is to be accorded its broad meaning. More specifically, "pivot" when used in the context of a onepiece nylon cable tie is intended to include some flexing in addition to pure rotation about an imaginary hinge. Finger 48 extends from adjacent the transitional portion 28 generally toward the dog 46. More particularly, and as shown in FIGS. 8–13, dog 46 and finger 48 extend from opposite surfaces 49, 51 of the head which partially define aperture 38 with the dog 46 adjacent the strap entry face 34 and the finger 48 disposed closer the strap exit face 36. Head 26 also includes a slot 50 adjoining aperture 38 and extending from finger 48 toward the strap exit face to permit finger 48 to deflect sufficiently to permit strap 24 to be inserted between the finger and the dog, and the head further includes a slot 53 extended from entrance face 36 toward dog 46. It will be appreciated that slot 53 serves as a well for the portion of strap 24 disposed adjacent entry face 34 when tie 22 is disposed about a large bundle. Finger 48 has a position, as shown in FIG. 9, wherein its spacing from dog 46 is sufficient to permit strap passage therebetween. Both dog 46 and finger 48 are integral with head 26.

Referring to FIGS. 8–11, dog 46 includes a surface 52 for guiding strap 24 against finger 48 when the strap is initially inserted into aperture 38. The dog further includes a surface 54 for seating and securely engaging a rung 32 to prevent the strap from releasing from head 26. Surface 52 is generally convex and extends from adjacent strap entrance face 34 toward strap 24 and toward strap exit face 36. Surface 54 is a concavity and defines a saddle for securely seating the rung 32 to be engaged.

Finger 48 is joined to head 26 by a neck 56 which serves as a pivot with the neck disposed closer to strap exit face 36 than most of seating surface 54. The finger is provided with a generally convex pusher or cam surface 58 which extends from adjacent the strap exit face towards seating surface 54 and towards the strap entrance face. Finger 48 is sized to at least partially extend between adjacent rungs 32 and, upon retrograde movement of the strap through head 26, cam surface 58 will engage a rung 32 and deflect strap 24 toward dog 46 so that the rung previously engaged by surface 58 will be seated on the saddle defined by surface 54. The head includes a pair of spaced abutments in the form of rails 60 straddling finger 48 which serve to limit movement of strap 24 away from dog 46 and ensure that the strap is properly positioned to be engaged by pusher surface 58. By limiting strap movement toward finger 48, rails 60 insure the finger can deflect out of the way of the strap.

Figure 10:
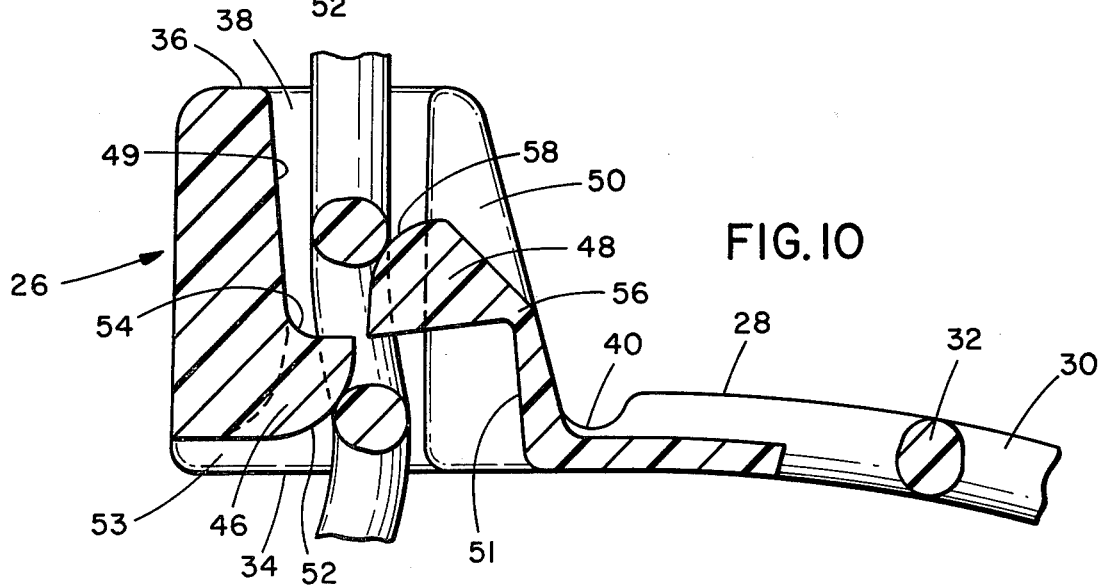
FIG. 10, similar to FIG. 8, shows a surface of the pusher means engaging a rung of the strap to push the strap toward a locking means carried by the head upon application of withdrawal forces to the strap.
Figure 11:
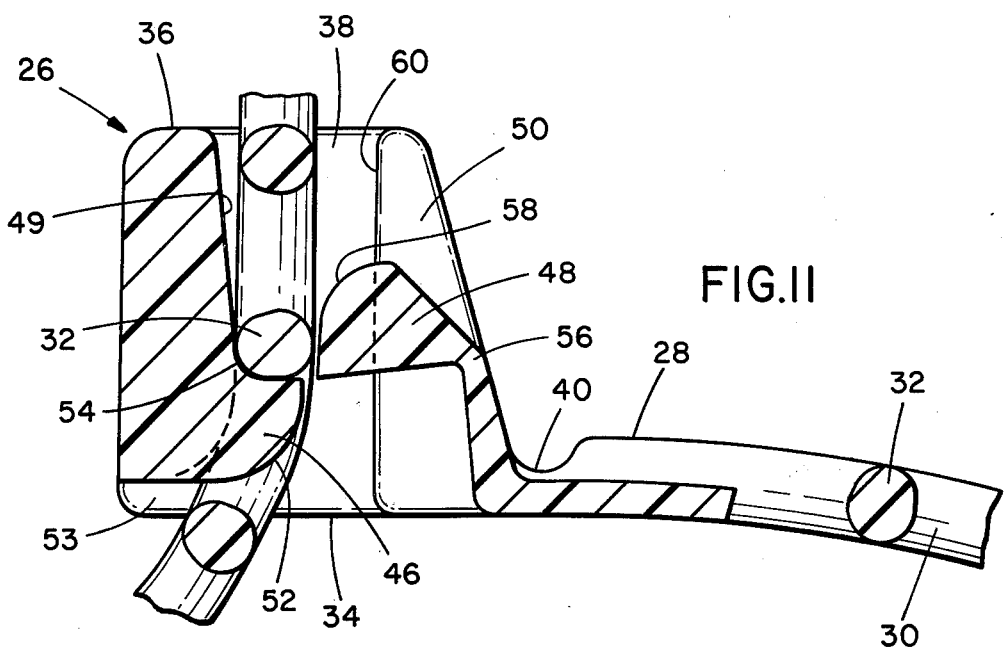
FIG. 11, also similar to FIG. 8, shows the rung in secure engagement with the locking means.

Operation of cable tie 22 is as follows: After strap 24 has been positioned about the objects to be bundled, tail 42 is inserted into aperture 38. As the tie is tightened about the objects, rungs 32 sequentially interfere with and deflect finger 48 to its position shown in FIG. 9. After each rung passes dog 46, finger 48 moves resiliently toward the dog until pusher surface 58 engages the rung which last passed the dog. When the strap has been released, the resiliency of the strap and the bundled objects causes application of withdrawal forces to the strap. As the strap starts its retrograde movement, the engaged rung 32 slides on surface 58 which functions as a cam surface and the strap is constrained to move toward dog 46 as shown in FIG. 10. Finally, referring to FIGS. 11 and 12, the rung 32 will securely seat on concave surface 54 thereby preventing further retrograde movement of the strap. The spacing between dog 46 and finger 48 is preferably sufficient that with the rung 32 securely seated on surface 54, the engaged rung is out of engagement with finger 48. Thus only dog 46 is required to be of sufficient strength to withstand the strap withdrawal force.

It will be appreciated that cable tie 22 is significantly more resistant to high withdrawal forces than prior art ties having stretched ladder straps because locking dog 46 is non-pivotally fixed to head 26 and avoids inclusion of any weakened portions required to provide flexibility. It should further be noted that since finger 58 only functions to transfer the strap to dog 46 in response to application of withdrawal forces rather than itself resist the withdrawal forces, neck 56 can be quite thin and flexible permitting strap 24 to be threaded into head 26 with relatively low force.

As shown in FIG. 13, when cable tie 22 is tightened about a small bundle, joint 40 permits transitional portion 28 to sharply fold back upon itself so that the segment of strap 24 adjacent strap entry face 34 extends generally parallel to the axial direction of strap-receiving aperture 38. It will readily be understood that with a strap and transitional portion of uniform cross section, the angle of entry of the strap into the head is a function of the size of the bundle. Without joint 40, the strap entrance angle for a small bundle would be substantially less than ninety degrees and the strap could bear on surface 49 adjacent the strap exit face so that a component of the withdrawal force might tend to cause finger 48 to move toward its deflected position.

The above-described head, dog finger, etc. structures could be used with a strap that is molded to its final dimensions as opposed to being stretched after molding, all with the same advantageous results.

In view of the above, it will be seen that the several objects of the invention are achieved and other advantageous results attained.

As various changes could be made in the above constructions without departing from the scope of the invention, it is intended that all matter contained in the above description shall be interpreted as illustrative and not in a limiting sense.

What is claimed is:

1. A self-locking cable tie for forming a plurality of elongate objects such as wires into a bundle and comprising:
    an elongate flexible strap positionable about the objects to be bundled and including a plurality of spaced transversely extending abutments, said strap being of the ladder type having a pair of spaced, generally longitudinally extending side rails, said abutments constitute rungs joining said rails;
    a head extending from adjacent one end of said strap, having a strap entrance face and a strap exit face, and having a transverse aperture extending between said faces for receiving the distal end of said strap;
    non-pivotal locking means carried by said head and extending into said aperture for securely engaging a preselected one of said abutments; and
    pusher means carried by said head and extending into said aperture and responsive to retrograde movement of the strap to push the abutment to be held into engagement with said locking means, said pusher means having a position wherein its spacing from said locking means is sufficient to permit strap passage therebetween whereby said strap can be threaded with relatively low force as said pusher means is not required to resist strap withdrawal forces.

2. A tie as set forth in claim 1 wherein said strap is made of a plastic material comprising stretch-oriented molecules.

3. A tie as set forth in claim 1 wherein said locking means and said pusher means are integral with said head.

4. A tie as set forth in claim 1 wherein said locking means and said pusher means extend oppositely into said aperture.

5. A tie as set forth in claim 2 wherein said pusher means comprises a finger pivotally connected to said head and wherein said head includes a slot adjoining said aperture and extending from said finger towards said strap exit face thereby permitting deflection of said finger upon threading of the strap into the head.

6. A tie as set forth in claim 2 wherein said finger extends from adjacent the strap and wherein a portion of the surface of the finger closest the strap exit face extends away from said strap and toward said strap entry face to push said strap toward said locking means upon attempted strap withdrawal, said portion being closer to said strap exit face than said locking means.

7. A tie as set forth in claim 1 wherein said locking means is a fixed dog shaped to extend between adjacent rungs of said strap.

8. A tie as set forth in claim 2 wherein the surface of said dog closest said strap exit face is a concavity and defines a saddle for seating the rung to be engaged.

9. A tie as set forth in claim 9 wherein said dog and said pusher means extend from opposite directions into the aperture with the pusher means extending from adjacent the strap and wherein the surface of the dog closest the strap entry face extends toward the strap and toward the strap exit face to guide the strap against the pusher means upon insertion of the strap into the aperture.

10. A tie as set forth in claim 8 wherein said pusher means comprises a finger pivotally connected to said head, said finger having a reduced thickness neck joining said head.

11. A tie as set forth in claim 10 wherein said neck is closer to said strap exit face than most of the surface of the locking means engagable with the rung to be held.

12. A tie as set forth in claim 1 wherein said strap and said head are joined by a transitional portion which has a cross section greater than the cross section of said rails.

13. A tie as set forth in claim 12 wherein said strap is made of a plastic material of stretch-oriented molecules and said transitional portion is made of a plastic material having relatively non-oriented molecules and wherein said transitional portion includes a joint of reduced cross section.

14. A self-locking harness for forming a plurality of elongate objects such as wires into a bundle comprising:
- an elongate flexible ladder strap positionable about the objects to be bundled and including at least one longitudinally extending rail and spaced transverse rungs extending from said rail;
- a head extending from one end of said strap, having respective strap entry and strap exit faces, and having a transverse aperture extending between the faces for receiving the free end of the strap;
- an abutment fixed to said head and extending into the aperture and engagable with a preselected one of said rungs; and
- pusher means pivotally carried by the head, extending into said aperture, and responsive to retrograde movement of said strap to push the strap into engagement with said abutments, said pusher means having a position wherein its spacing from said abutment is sufficient to permit strap passage therebetween whereby the strap can be threaded with relatively low force.

* * * * *

UNITED STATES PATENT AND TRADEMARK OFFICE
CERTIFICATE OF CORRECTION

PATENT NO. : 4,001,898
DATED : 1/11/77
INVENTOR(S) : Jack E. Caveney

It is certified that error appears in the above-identified patent and that said Letters Patent are hereby corrected as shown below:

Column 4, line 12: "onepiece" should be ---one-piece---;

Column 6, line 24: "2" should be --4--;

line 40: "2" should be --7--;

line 43: "9" should be --7--.

Signed and Sealed this

Seventeenth Day of May 1977

[SEAL]

Attest:

RUTH C. MASON
*Attesting Officer*

C. MARSHALL DANN
*Commissioner of Patents and Trademarks*